INVENTOR
LAWRENCE W. SCHOPPEE
BY Chapin & Neal
ATTORNEYS

Sept. 22, 1953

L. W. SCHOPPEE
DEVICE FOR FORMING AND SUPPLYING
GUM STICKS TO A WRAPPING MACHINE 2,652,788

Filed Dec. 21, 1949

Fig. 8.

INVENTOR
LAWRENCE W. SCHOPPEE
BY Chapin & Neal
ATTORNEYS

Patented Sept. 22, 1953

2,652,788

UNITED STATES PATENT OFFICE 2,652,788

DEVICE FOR FORMING AND SUPPLYING GUM STICKS TO A WRAPPING MACHINE

Lawrence W. Schoppee, Springfield, Mass., assignor to Package Machinery Company, East Longmeadow, Mass., a corporation of Massachusetts Application December 21, 1949, Serial No. 134,215

8 Claims. (Cl. 107—4)

This invention relates to a machine for forming gum sticks and supplying them to a wrapping machine. The principal object of the invention is to provide a machine of the above character which will advance a slab of gum material, having a width corresponding to the desired length of the gum stick and of a length to provide a plurality of sticks of desired width, sidewise through a device which scores the slab transversely to define the gum sticks and subsequently advances the so-scored slab through a breaking mechanism which separates the slab along the score lines into a plurality of gum sticks.

A further object is to provide a device of the above character which will collect the gum sticks, as they come from the breaking mechanism, into a stack, hold the stacked gum sticks in readiness for automatic delivery to the gum magazine of a wrapping machine when the latter needs replenishing, and which upon such delivery will automatically prepare another stack of gum sticks to be held in readiness for the next call from the wrapping machine.

Other and further objects will be made apparent in the following specification and claims.

In the accompanying drawings which illustrate one embodiment of the invention.

Figure 1:
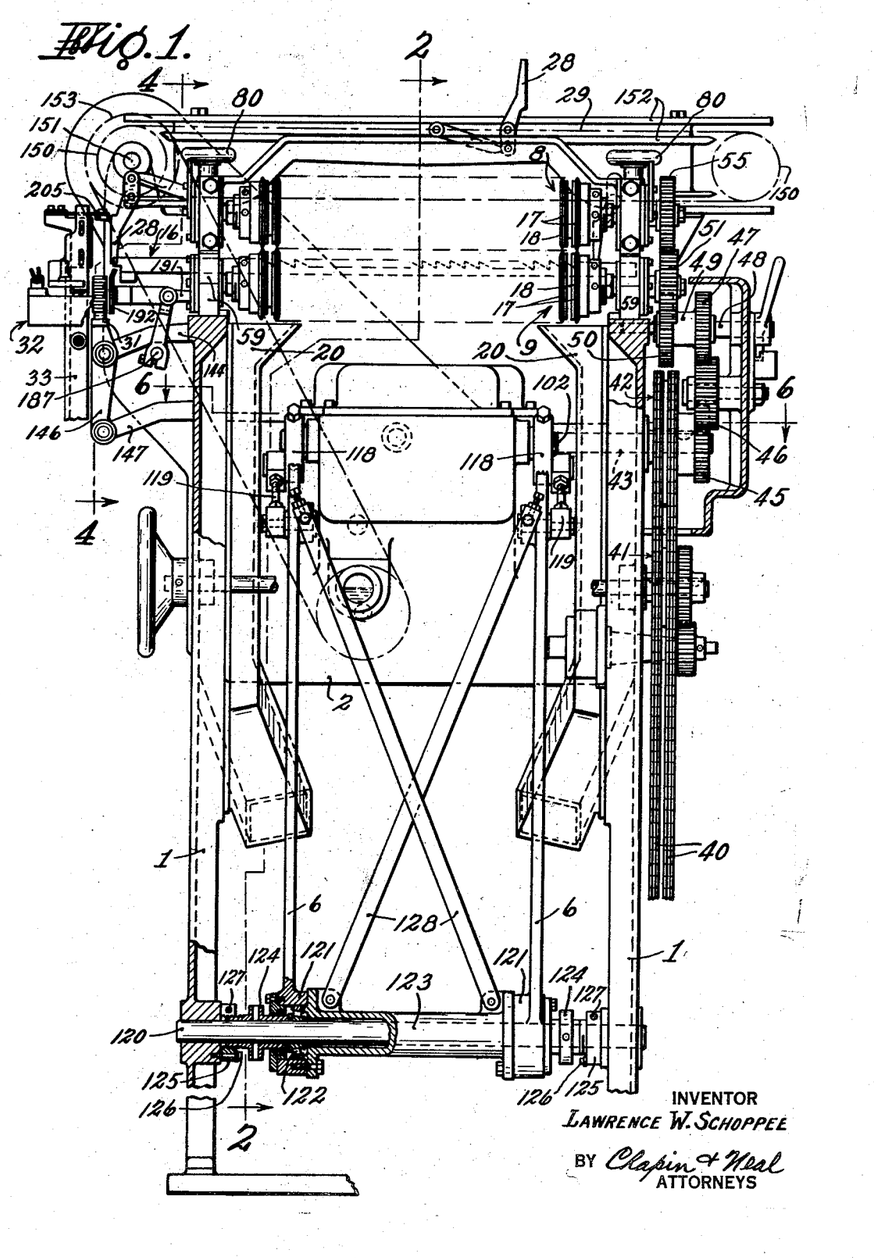
Fig. 1 is a front elevational view of the machine parts being broken away.
Figure 2:
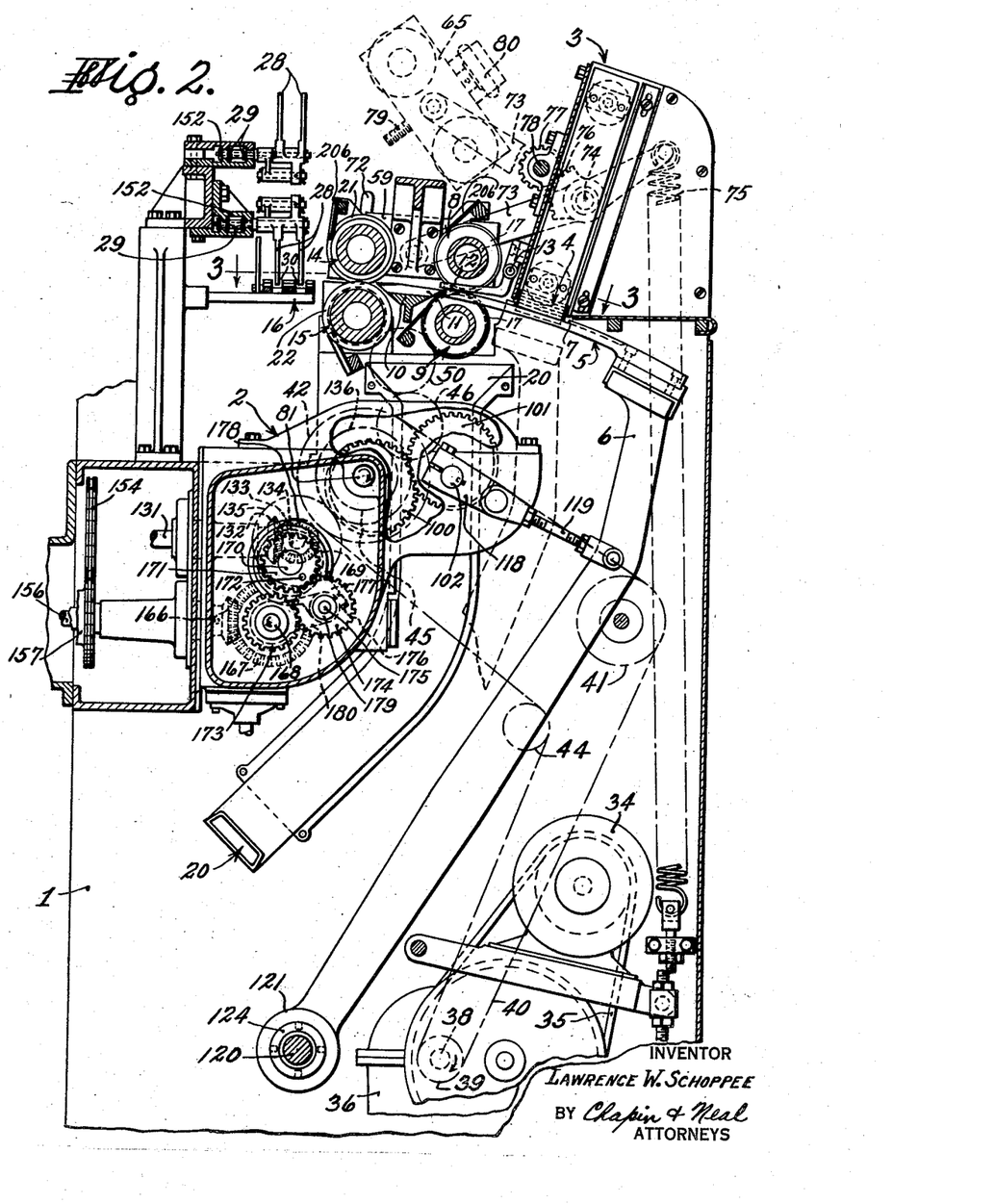
Fig. 2 is a sectional view substantially on lines 2—2 of Fig. 1.

Referring to Figs. 1 and 2, the machine comprises two side frames 1 joined together by a central crank case 2 which supports a hopper 3 adapted to receive a stack of elongated gum slabs 4. The stack of slabs rests upon a plurality of pusher fingers generally indicated at 5 which are carried by spaced arms 6. As shown in Fig. 2 the arms are at their outermost position and as they are advanced, by means later described, the lowermost gum slab is engaged by shoulders 7 formed on the fingers 5 and advanced by the shoulders between upper and lower scoring rolls 8 and 9 to a position above the bridge member 10. Upon rearward movement of the fingers 5 the scored slab is left upon the bridge member which is grooved as at 11 to receive the fingers. Reverse movement of the slab is prevented by gravity actuated detent fingers 12 pivoted at 13 to the adjacent side of the hopper 3.

Upon the next advancing movement of the fingers, to carry a second slab between the scoring rolls, the previously scored slab, left resting upon the bridge, is engaged by the forward ends of the pusher fingers 5 and carried through upper and lower rotating breaker rolls 14 and 15 which separate the slab along the score lines into separate gum sticks which are deposited by the pusher fingers upon a collector platform generally indicated at 16.

Figure 3:
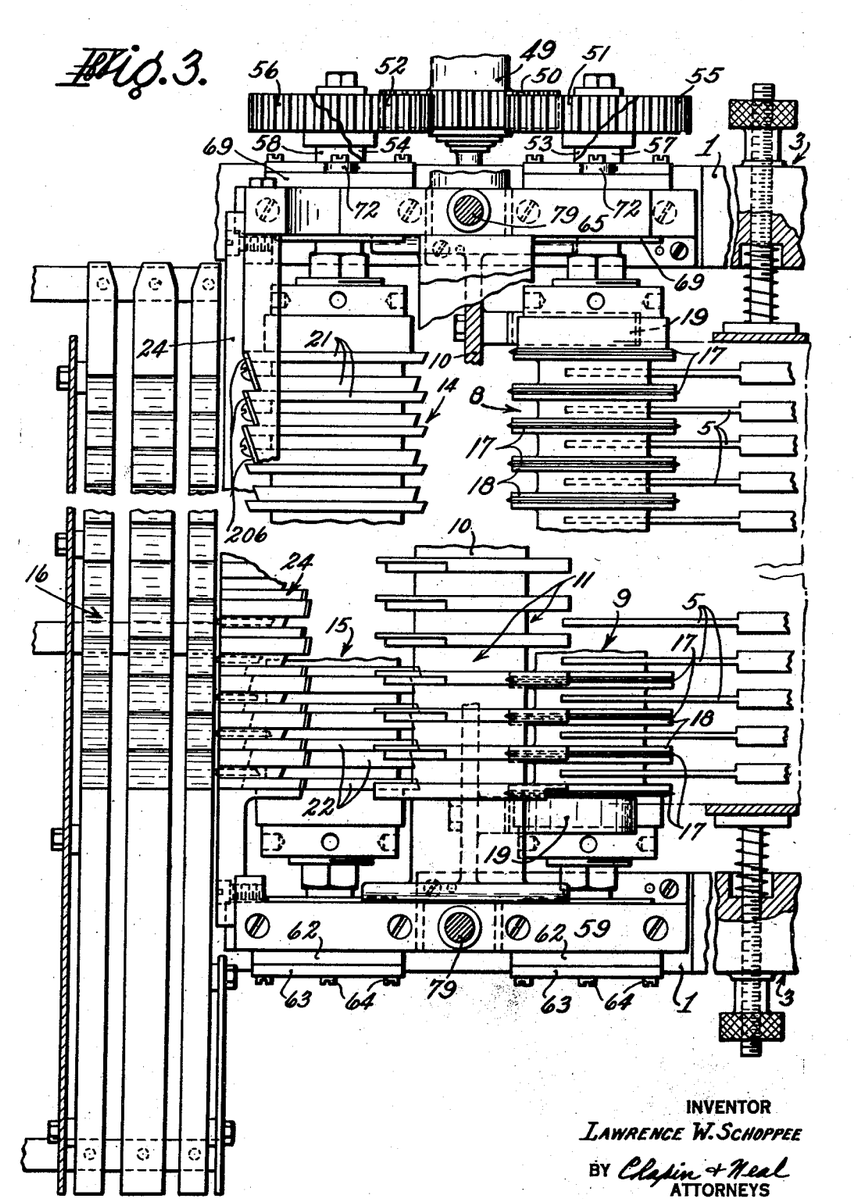
Fig. 3 is a sectional view substantially on line 3—3 of Fig. 2.

As best shown in Figs. 1 and 3, the scoring rolls 8 and 9 comprise a plurality of spaced scoring disks 17 held between pairs of supporting flanges 18 of less diameter than the scoring disks. It will be understood that the upper and lower scoring rolls are spaced vertically apart a sufficient distance to form deep scores on opposite sides of the slabs 4 but without severing them. The ends of the scoring rolls are each provided with a scoring disk 17 which scores the end portions or selvage of the gum slab so that the gum slabs may be trimmed to exact length before they pass onto the bridge. Associated with the lower scoring disks (Figs. 3 and 4) are stripper blades 19 which remove the selvage from each end of the gum slab as the latter passes from the scoring rolls. The so-detached selvage portions pass through chutes 20 into a box, not shown.

Figure 5:
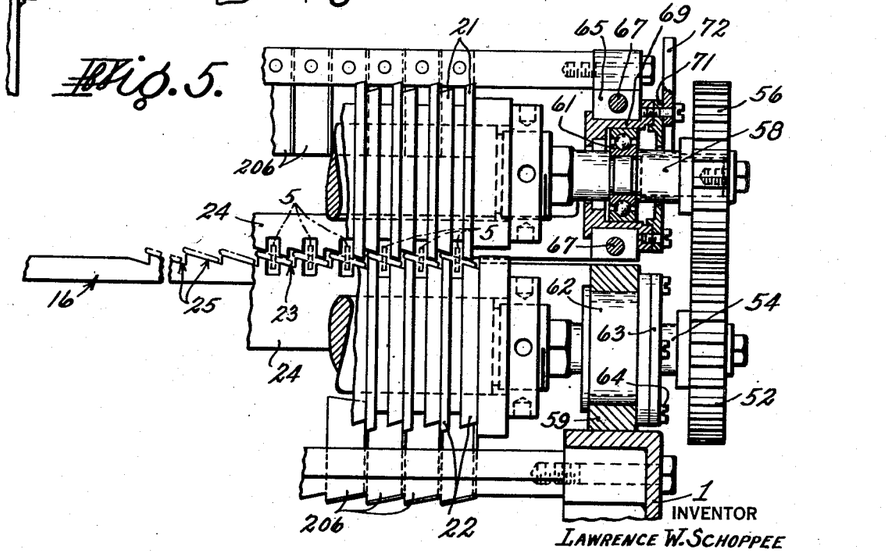
Fig. 5 is a fragmentary sectional view, substantially on line 5—5 of Fig. 4, showing the breaking rolls, parts being broken away to show the guide plate and collector bar beyond the rolls.

As best shown in Fig. 5, the surfaces of the upper and lower breaking rolls are formed as a series of matching frusto-conical surfaces 21 and 22 respectively, separated from each other the thickness of the gum material. As shown in Fig. 5, the conical surfaces are each provided with a central groove to permit passage of the pusher fingers 5 as the gum slabs are carried through the rolls by the fingers. As will be apparent in Fig. 5, the high and low portions of adjacent conical surfaces engage the gum slab on opposite sides of the score lines with the result that the opposed conical surfaces engaging the portions of the slab between the score lines turn such portions about a longitudinal axis thereof and into parallel planes which are inclined to the plane of the slab, thereby breaking said portions apart into individual gum sticks along said score lines. The individual gum sticks are advanced by the fingers 5 through openings 23 in a vertical guide plate 24 and onto the collector platform 16 which, as shown in Fig. 5, is provided with inclined surfaces 25 upon which the separate sticks are deposited.

Figure 9:
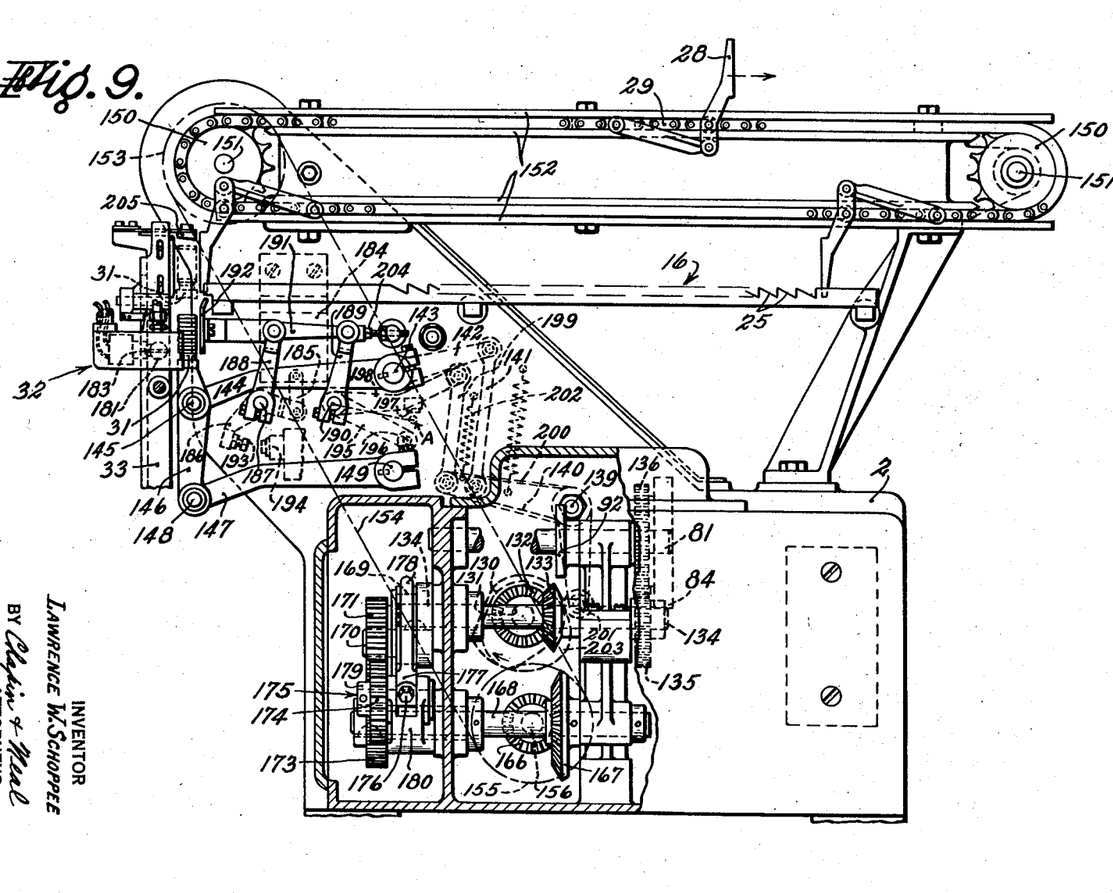
Fig. 9 is a sectional view substantially on line 9—9 of Fig. 8, showing the gum stick collecting and discharge mechanism.

As best shown in Figs. 9 and 2, three spaced pairs of fingers 28 are carried by parallel chains 29. The ends of fingers 28 extend into grooves 30 in the platform, and as the fingers sweep along the platform from right to left as viewed in Fig. 9 the fingers collect and stack the gum sticks at the forward end of the platform and deposit them on an elevator 31 which at that time is in its upper position as shown in dotted lines in the latter figure. The elevator 31 then lowers the stack of gum sticks to the full line position of Fig. 9 where the operation is halted until an "electric eye" unit generally indicated at 32 positioned at the upper end of the gum stick magazine 33 of the wrapping machine calls for additional gum sticks and initiates the next cycle of operation of the gum breaker as later more fully described.

Referring to Figs. 1 and 2, power is supplied to the various mechanisms of the gum breaker by a constantly operating motor 34 which drives, through a belt 35 and reduction unit 36, a shaft 38 carrying sprockets 39 which drive a dual chain 40. Chain 40 passes over idler sprockets 41 around sprockets 42 carried by a shaft 43 (Fig. 6), and thence around guide sprockets 44 back to the driving sprockets 39. Shaft 43 carries a gear 45 (Figs. 1 and 2) which, through an intermediate gear 46, drives a gear 47 mounted on a stub shaft 48. Connected to gear 47 by a hub 49 is a gear 50 which meshes (Fig. 3) with gears 51 and 52 secured respectively to shafts 53 and 54 of the lower scoring and breaking rolls. Gears 51 and 52 respectively mesh with gears 55 and 56 secured to respective shafts 57 and 58 of the upper scoring and breaking rolls. The scoring and breaking rolls are thus constantly driven.

Figure 4:
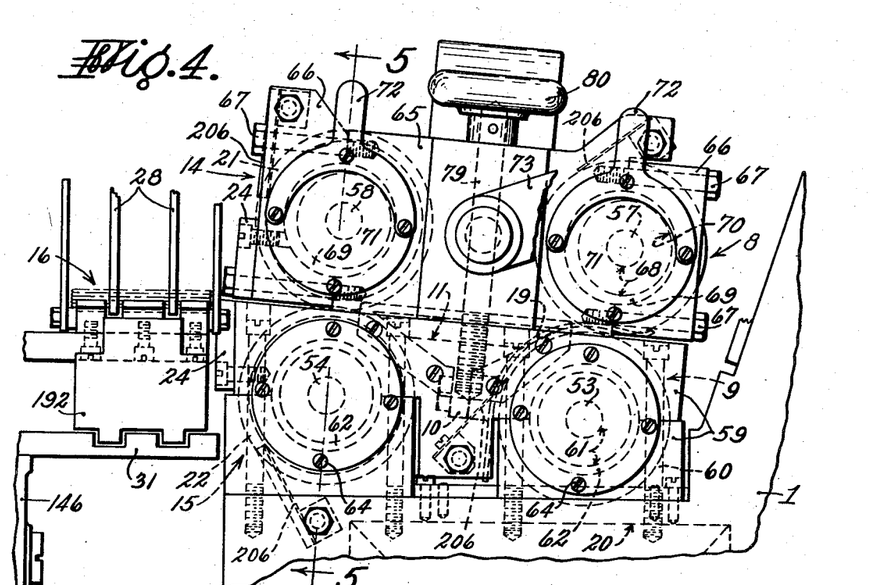
Fig. 4 is a sectional view substantially on line 4—4 of Fig. 1.

The ends of shafts 53 and 54 rotate in ball bearing assemblies, Figs. 4 and 5, supported in split bearing blocks 59 mounted on the side frame members 1, the halves being held together and the blocks as a whole being secured to the frame by screws 60. The bearing assemblies comprise ball bearing units as indicated at 61 which are housed in cup-like cylindrical members 62 provided with caps 63 secured to the members 62 by screws 64. The members 62 are clamped between the halves of the block 59 by the screws 60. The ends of upper shafts 57 and 58 rotate in similar ball bearing assemblies clamped in upper bearing blocks 65 having split ends 66 held in place by screws 67. The ball bearing units 68 of the upper rolls are housed in cylindrical members 69 which differ from the member 62 in that the openings 70 in which the bearing units 68 fit are eccentric and the caps 71 are provided with handles 72 so that when screws 67 are loosened the eccentric members 69 may be rotated in the blocks 65 to adjust the spacing between the upper and lower rolls. The members 69 are clamped in adjusted position by tightening the screws 67.

For convenience in cleaning, repair and similar purposes the upper blocks 65 are preferably mounted to be swung upwardly, as shown in dotted lines in Fig. 2, to give access to the upper and lower rolls. For this purpose the blocks 65 are pivotally carried at the ends of a pair of spaced arms 73, which are pivoted intermediate their ends, as at 74, to the side frame of the machine. The outer ends of arms 73 are connected to counterbalancing springs 75, one of which is shown in Fig. 2, and the arms are maintained in parallelism by gear segments 76 secured one to each arm and meshing with gears 77 secured to a cross shaft 78. The upper blocks are releasably secured in operative position on the lower blocks 59 by screws 79 provided with operating heads 80, and having their lower ends threaded in the lower blocks.

Figure 6:
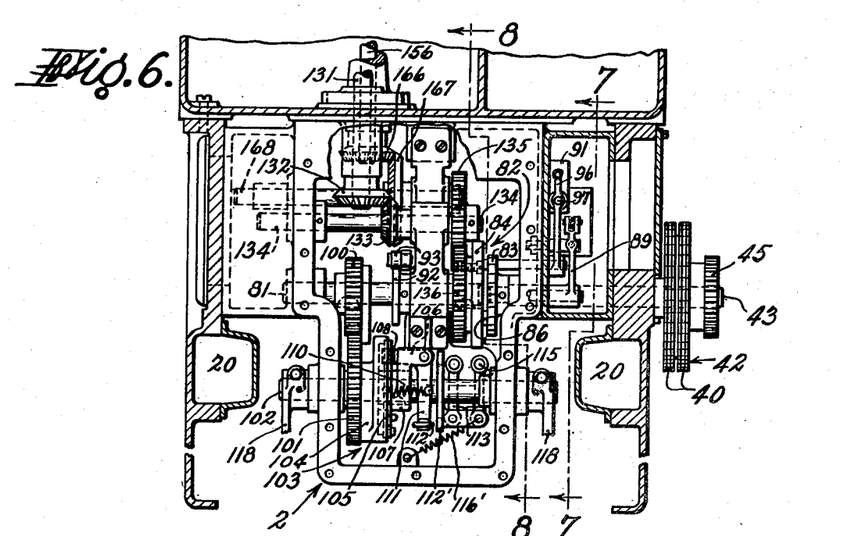
Fig. 6 is a sectional view substantially on line 6—6 of Fig. 1.

As shown in Fig. 6, shaft 43 is adapted to be coupled at its inner end to an aligned shaft 81 by means of a one revolution clutch mechanism generally indicated at 82, which is actuated by the electric eye 32, previously mentioned, to thereby transmit power from shaft 43 to shaft 81 for one revolution of the latter.

Figures 7, 10:
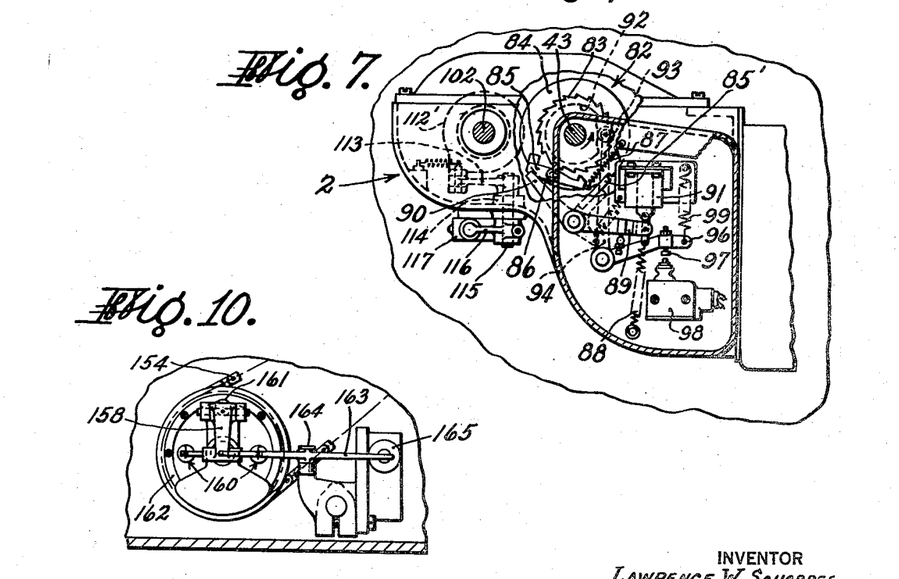
Fig. 7 is a detail sectional view substantially on line 7—7 of Fig. 6.
Fig. 10 is a detail view of the overload release switch for the collecting drive.

As shown in Fig. 7, clutch 82 comprises a driving ratchet 83, secured to the shaft 43, and a disk 84 secured to the adjacent end of shaft 81 and carrying a pawl 85 pivoted to the disk at 86. The pawl 85 is urged into driven engagement with ratchet 83 by a spring 87 but is normally held out of engagement therewith by a spring 88 connected to one arm 89 of a bell crank, the other arm 90 of which engages the pawl to hold the latter out of engagement with the ratchet. Arm 89 is also connected to a solenoid 91. The circuit through the solenoid 91 is adapted to be closed by the action of electric eye 32, as later described, to release the pawl 85 and thereby couple shaft 81 to the constantly driven shaft 43. The shaft 81 carries a cam 92 which is engaged by a cam roll 93 secured to one arm 94 of a pivoted bell crank, the other arm 96 of which carries an actuator 97 which engages and opens a normally closed switch 98 in the electric eye circuit after about 20° of rotation of cam 92 with the result that the circuit of solenoid 91 is reopened. Arm 90 is thereby swung back into the path of pawl 85 to be engaged thereby upon completion of one revolution of the disk. A spring actuated pawl detent 85' prevents reverse rotation of disk 84. Spring 99 maintains the roll 93 in engagement with cam 92.

Shaft 81 carries an elliptical gear 100, Figs. 6 and 2, which meshes with a second elliptical gear 101 freely mounted on a transverse shaft 102, from which pusher arms 6 are driven. Gear 101 is normally connected to shaft 102 by a conventional over-load release clutch generally indicated at 103. This clutch comprises a member 104 fixed to the gear 101 and carrying an annular member 105. A bell crank 106 pivoted to a hub 107 which is secured to shaft 102 has one of its arms provided with a roll 108 normally held in a recess 109 (Fig. 7) formed on the inner periphery of the annular member 105 under the action of a spring 110 connected between the other arm 111 of the bell crank and member 104. As will be obvious, an overload on shaft 102 will cause roll 108 to ride out of recess 109 to interrupt the driving connection between gear 101 and shaft 102. The arm 111 of bell crank 106 carries a roll 112 which, when the clutch is released due to an overload, engages an annular ring 112' having a rearwardly extending arm pivoted by parallel links 113 to a bracket 114. One of the pivot pins 115 of one of the links 113 carries a member 116 (Fig. 7) which actuates a switch 117 to open the circuit of the motor when ring 112' is moved axially by roll 112. A spring 116' normally maintains switch 117 closed.

Each end of shaft 102 carries a crank 118 connected by adjustable links 119 to the arms 6 which as previously described support and operate the pusher fingers 5. The lower ends of arms 6 are pivotally mounted on a fixed shaft 120. In order to secure proper alignment of the fingers 5 with the grooves and openings through which they oscillate the arms 6, as shown in Fig. 1, are made adjustable longitudinally on shaft 120. As shown in the latter figure, the lower ends of arms 6 are formed with hubs 121 mounted on bearings 122 which are slidable on shaft 120, and are held between the ends of a tubular spacing member 123 and the inner ends of collar members 124. The outer ends of collars 124 are threaded in split hubs 125 secured by bolts 126 to the side frame. By adjusting the position of the collars 124 in the hubs 125 the position of bearings 122 and the arms 6 on shaft 102 may be adjusted, the bearings being clamped in adjusted position by tightening bolts 127 at the split ends of the hubs 125. The arms 6 are braced by cross braces 128 connected at their lower ends to spacer 123 and at their upper ends to the arms 6.

Figure 8:
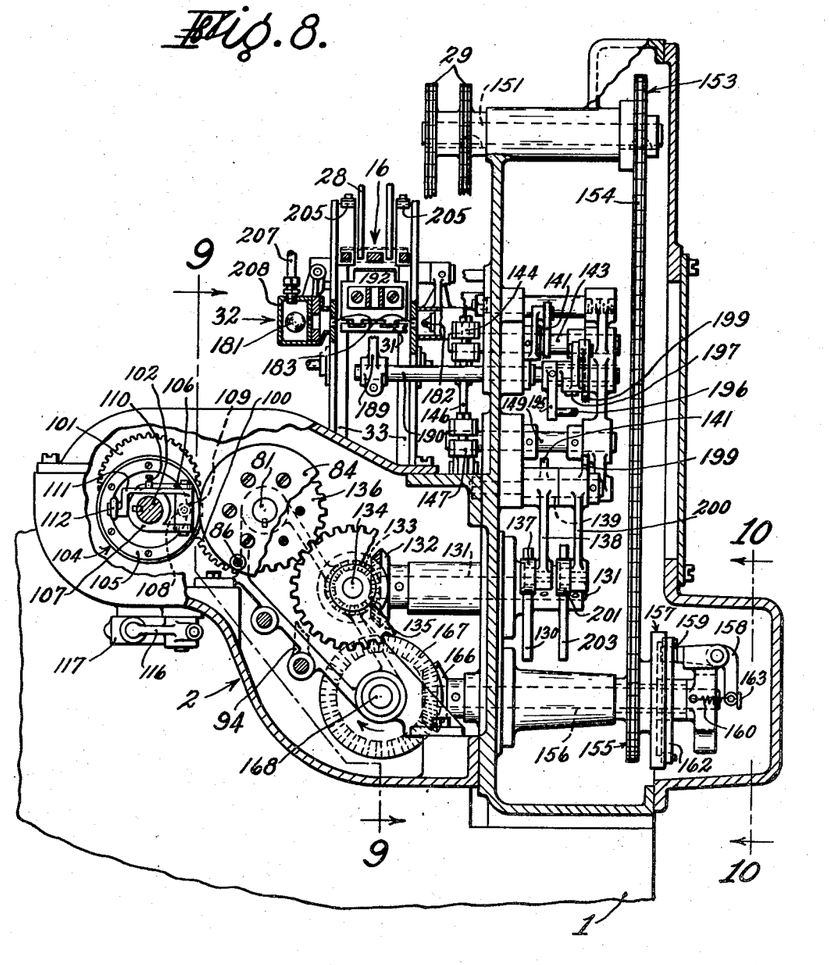
Fig. 8 is a sectional view substantially on line 8—8 of Fig. 6.

As shown in Figs. 8 and 9, the elevator 31 is raised and lowered by a cam 130 secured to a shaft 131 which carries a bevel gear 132 meshing with a bevel gear 133 secured to a shaft 134. Shaft 134 carries a gear 135 meshing with a gear 136 secured to shaft 81. Cam shaft 131 is thus driven when shaft 81 is coupled to constantly rotating shaft 43 by clutch 82 as previously described. Cam 130 is engaged by a cam roller 137 carried at the end of one arm 138 of a bell crank pivoted on a stud 139, the other arm 140 of the bell crank being connected by a link 141 to an arm 142 of a rock shaft 143. One member 144 of a parallel linkage is secured to an end of rock shaft 143, the other end of member 144 being pivoted at 145 to the elevator support 146. The second member 147 of the parallel linkage is pivoted at 148 to support 146, the other end being secured to a pivot shaft 149.

Still referring to Figs. 8 and 9, the collector chains 29 which carry the collector fingers 28 travel around sprockets 150 fixed to shafts 151, the upper and lower runs of the chains traveling in suitable guides 152. One of the shafts 151 carries a drive sprocket 153 connected by a sprocket chain 154 to a sprocket 155 rotatably mounted on a shaft 156 and normally connected thereto by an overload release clutch 157 similar to that previously described and including a bell crank 158 carrying a roll 159 normally held by a spring 160 in a recess 161 (Fig. 10) in a ring member 162 secured to the sprocket 155. In the event that roll 159 is forced out of recess 161 by an overload on the conveyor chains the opposite end of bell crank 158 engages one end of a lever 163, pivoted intermediate its ends at 164, the other end of which actuates a switch 165 to open the motor circuit.

Referring to Figs. 2 and 9, shaft 156 carries a bevel gear 166 meshing with a bevel gear 167 fixed on a shaft 168. Shaft 168 is intermittently driven from shaft 134 previously described, through a so-called wobble gearing of the general type described in prior Patent 2,210,734. As here employed the wobble gearing comprises a disk 169 eccentrically fixed to constantly driven shaft 134 and carrying a stud 170 upon which is fixed the wobble gear 171 by means of a pin 172 passing through gear 171 and disk 169. Shaft 168 has fixed thereon a gear 173 which meshes with an intermediate gear 174 rotatably mounted on a stub shaft 175 clamped by bolt 176 in one end of a strap link 177, the strap portion 178 of which pivotally embraces the periphery of disk 169. A collar 179 retains gear 174 on stub shaft 175. A link 180 connects stub shaft 175 to shaft 168.

As best shown in Figs. 8 and 9, the electric eye unit 32 comprises a source of light, such as an electric lamp 181 positioned at one side of the gum stick magazine 33 and a photo-electric cell 182 positioned on the opposite side. The lamp projects a beam of light through aligned openings 183 in the walls of the magazine, which in the absence of gum sticks in the magazine at the level of the beam falls on the photo-electric cell and causes the latter to actuate a solenoid indicated at 184 in Fig. 9 through a conventional photo-electric relay, not shown. A link 185 connects the armature of the solenoid to one arm of a bell crank 186 which is fixed to a rock shaft 187 to which is secured an arm 188 which forms one member of a parallel linkage, the other member of which comprises an arm 189 secured to a rock shaft 190. Pivotally connected to the free ends of arms 188 and 189 is a bar 191 carrying at its forward end a plate 192. Upon actuation of the solenoid 184 the bar 191 is moved forward by arm 188 to bring plate 192 into engagement with the stack of gum sticks resting on elevator 31 and transfer the stack from the elevator to the magazine 33.

The other arm of bell crank 186 carries an adjustable stop member and actuator 193 which engages and closes a normally open switch 194 in the circuit of solenoid 91 thereby actuating the one revolution clutch 82, as previously described, to drive the several mechanisms through one cycle of operation.

The solenoid 184 is deenergized toward the end of the cycle by the opening of switch 98 in the circuit of the electric eye. The transfer bar 191 is then free to return to the position of Fig. 9 under the weight of the solenoid armature and the various linkage members. To assure the return of bar 191 and the opening of switch 194, rock shaft 190 carries an arm 195 from the free end of which extends a pin 196, which upon forward movement of the transfer bar is moved to the dotted line position indicated at A in Fig. 9. In the latter position pin 196 is just short of engagement with a boss 197 fixed to a lever 198 pivoted at one end on shaft 190. The free end of lever 198 is connected by a link 199 to one arm of a bell crank 200, the other arm of which carries a roll 201 held in engagement, by a spring 202, with a cam 203 secured on the cam shaft 131. Cam 203 is formed to swing lever 198 downwardly to cause boss 197 to engage pin 196 and positively return the transfer bar 191 and actuator 193 to their initial positions, rearward movement of the bar being limited by an adjustable stop member 204.

Cam 203 is timed to assure return of bar 191 prior to the upward movement of elevator 31 to receive the next stack of gum sticks from the collector fingers.

Preferably the cam 130 is formed to raise the elevator upwardly a slight distance after the latter has received the stack of gum sticks to press the stack against spring fingers 205 for the purpose of straightening any sticks which may have been twisted out of shape in passing through the breaker rolls. The elevator is returned to lower position with its load of sticks just prior to the automatic throwing out of clutch 82 upon completion of one revolution of shaft 81.

Because of the inherent tacky character of the gum material it is customary to dust the surface of such material with starch or other suitable powdered material to inhibit its sticking to surfaces with which it comes in contact in handling, and to facilitate its wrapping. Unavoidably a certain amount of this powdered material is loosened from the gum in the course of its manipulation. Scrapers 206 are preferably associated with the several scoring and breaking rolls to remove any powdered material adhering thereto. To avoid the possibility of the accumulation of an interfering cloud of such loosened material in the path of the light beam which actuates the photo-electric cell 182, a constant air pressure is supplied through a pipe 207 to the housing 208 of the light source 181, thereby providing an air blast through openings 183 which maintains a clear path for the light beam.

By the present invention a minimum of handling of the gum material is required, and from a slab form the gum sticks are quickly and accurately prepared and automatically delivered to the magazine of a wrapping machine. Furthermore, the speed of preparation and supply of the gum sticks is conformed to the speed of the wrapping machine without the necessity of accurately timing the gum preparatory mechanisms to the speed of the wrapping machine. The machine of the present invention is capable of preparing a quantity of gum sticks faster than the presently available wrapping machines can wrap them. If for any reason the wrapping machine is operated at a slow speed the preparation of the sticks is conformed automatically to the needs of the wrapping machine.

What I claim is:

1. In a machine for forming gum sticks, from slabs of gum material, a hopper for supporting a supply of elongated slabs, a pair of opposed scoring rolls spaced from said hopper, a pair of opposed breaking rolls spaced from said scoring rolls, a bridge member positioned between said pairs of rolls, an oscillatable member having a plurality of fingers traveling beneath said hopper and between the rolls of each of said pairs of rolls, shoulders formed intermediate the ends of said fingers to engage the lowermost slab in the hopper and advance the so-engaged slab through the scoring rolls to a position on said bridge to be engaged by the ends of said fingers upon the next advance movement of said oscillating member and advanced by the ends of said fingers through the breaking rolls, means to constantly drive said scoring and breaking rolls, and means to intermittently drive said oscillating member.

2. A machine for preparing and delivering a stack of gum sticks to the supply magazine of a wrapping machine which comprises, means for forming a plurality of individual gum sticks from a slab of gum material, a hopper for supporting a supply of slabs of gum material, means to feed a slab from said hopper to and through said forming means, means for stacking the so-formed gum sticks one upon another in vertical alignment, means for driving said feeding, forming and stacking means, said driving means including means normally limiting said feeding and stacking means to a single common cycle of operation, means to discharge the stack of gum sticks, as a unit, from the machine to the supply magazine of the wrapping machine, means to actuate said discharge means and means responsive to the operation of said discharge means to release said limiting means and initiate another cycle of operation of the feeding and stacking means.

3. A machine for preparing and delivering a stack of gum sticks to the supply magazine of a wrapping machine which comprises, means for forming a plurality of individual gum sticks from a slab of gum material, a hopper for supporting a supply of slabs of gum material, means to feed a slab from said hopper to and through said forming means, means for stacking the so-formed gum sticks one upon another in vertical alignment, means for driving said feeding, forming and stacking means, said driving means including means normally limiting said feeding and stacking means to a single common cycle of operation, means to discharge the stack of gum sticks, as a unit, into the supply magazine of the wrapping machine, means to actuate said discharge means when said magazine reaches a predetermined stage of exhaustion, and means responsive to the operation of said discharge means to release said limiting means and initiate another cycle of operation of the feeding and stacking means.

4. A machine for preparing and delivering a stack of gum sticks to the supply magazine of a wrapping machine which comprises, means for scoring a slab of gum material to define a plurality of gum sticks, means to receive the scored slab, means for breaking said slab along the scores to form individual gum sticks, a hopper for supporting a supply of slabs of gum material, means to feed a slab from said hopper to and through said scoring means onto said receiving means and to simultaneously feed a previously scored slab from said receiving means to and through said breaking means, means for stacking the so-formed gum sticks one upon another in vertical alignment, means for driving said feeding, scoring, breaking and stacking means, said driving means including means normally limiting said feeding and stacking means to a single common cycle of operation, means to discharge the stack of gum sticks, as a unit, from the machine to the supply magazine of the wrapping machine, means to actuate said discharge means and means responsive to the operation of said discharge means to release said limiting means and initiate another cycle of operation of the feeding and stacking means.

5. In a machine for preparing a stack of gum sticks from a slab of gum material, means for forming a plurality of gum sticks from a slab of gum material, a hopper for supporting a supply of slabs of gum material, means to feed a slab from said hopper to said forming means, means for stacking the so-formed gum sticks one upon another, means for constantly operating said forming means, means for intermittently and alternately operating said feeding and stacking means, and means for removing the finished stack of gum sticks from the machine subsequent to each stacking operation and prior to the succeeding operation of said feeding means.

6. In a machine for preparing a stack of gum sticks from a slab of gum material, a pair of scoring rolls provided with opposed annular scoring knives, a pair of breaking rolls provided with a plurality of opposed frusto-conical surfaces aligned with the spaces between the scoring rolls to engage the portions of the slab between the scores formed by the scoring rolls and turn each said portion from the plane of the slab into respective planes inclined to the plane of the slab and defined by said opposed frusto-conical surfaces to simultaneously break each portion from the adjacent portion, a receiving platform formed with a plurality of inclined surfaces one of said surfaces lying substantially in the plane to which each of said gum sticks has been turned by said breaking rolls, means to feed a slab of gum material to and through said scoring and breaking rolls and deposit the so-formed gum sticks one on each of said inclined surfaces, means moving along said platform transversely of said inclined surfaces in the direction of upward inclination thereof to collect and stack the gum sticks at one end of said platform, means for rotating said scoring and breaking rolls, means for intermittently and alternately operating said feeding and stacking means, and means for removing the finished stack of gum sticks from said platform prior to the succeeding operation of said feeding means.

7. Apparatus for supplying the article hopper of wrapping machines and the like which comprises, means to prepare and assemble a predetermined quantity of articles, less than the capacity of said hopper, in a given cycle of operation, means for driving said forming and assembling means, said driving means including means normally limiting said forming and assembling means to a single cycle of operation, and means, responsive to a predetermined depletion of the supply of articles in said hopper, to transfer the so formed assembly of articles to the hopper of the wrapping machine and simultaneously initiate a cycle of operation of said forming and assembling means to form another assembly of articles for transfer by said transfer means upon the succeeding operation of the latter, the rate of preparation and assembling of said articles by said first named means in said cycle being greater than the rate of depletion of articles remaining in the hopper at the time of the initiation of said cycle of operation.

8. In a machine for severing pieces of gum from a slab having spaced parallel score lines extending from side to side thereof to form individual gum sticks; a pair of opposed rolls, means to drive said rolls in opposite directions, the peripheral surface of each roll comprising a plurality of corresponding adjacent peripheral frusto-conical surfaces, the said peripheral conical surfaces of one roll directly opposing and facing the corresponding peripheral conical surfaces of the other roll and spaced therefrom a distance substantially equal to the thickness of the slab to be severed to form slab engaging bites between said opposed frusto-conical surfaces, means to advance the slab in the direction of its score lines and between said rolls to cause the portions of the slab between the score lines to be progressively engaged between respective opposed frusto-conical surfaces of said rolls and turned thereby from the plane of the slab into respective planes inclined to the plane of the slab and defined by the opposed bite forming frusto-conical surfaces of the rolls by which said portions are engaged.

LAWRENCE W. SCHOPPEE.

References Cited in the file of this patent

UNITED STATES PATENTS

| Number | Name | Date |
|---|---|---|
| 121,117 | Mauger | Nov. 21, 1871 |
| 1,158,287 | Redington et al. | Oct. 26, 1915 |
| 1,451,081 | Momenee | Apr. 10, 1923 |
| 1,771,734 | Penley | July 29, 1930 |
| 2,251,172 | Smith et al. | July 29, 1941 |
| 2,252,363 | Carus | Aug. 12, 1941 |
| 2,554,579 | Lauffer | May 29, 1951 |